United States Patent [19]

Yamasaki et al.

[11] Patent Number: 5,085,748
[45] Date of Patent: Feb. 4, 1992

[54] PROCESS FOR ENRICHING CARBON 13

[75] Inventors: Makoto Yamasaki; Yoshiharu Horita, both of Yokohama; Takashi Otsubo, Kawasaki; Takumi Kono, Kawasaki; Tomozumi Murata, Kawasaki; Yuji Fujioka, Kawasaki; Koichi Chiba, Kawasaki; Maki Sato, Kawasaki; Naoya Hamada, Sagamihara; Shigeyoshi Arai, Kyoto; Syohei Isomura; Hayato Kaetsu, both of Wako, all of Japan

[73] Assignees: Nippon Steel Chemical Co., Ltd.; Nippon Steel Corporation, both of Tokyo; Rikagaku Kenkyusho, Wako, all of Japan

[21] Appl. No.: 468,674

[22] Filed: Jan. 23, 1990

[30] Foreign Application Priority Data

| Jan. 24, 1989 [JP] | Japan | 1-13214 |
| Mar. 28, 1989 [JP] | Japan | 1-73780 |
| Mar. 30, 1989 [JP] | Japan | 1-76545 |
| Mar. 31, 1989 [JP] | Japan | 1-78314 |

[51] Int. Cl.$^5$ .............................. B01D 5/00
[52] U.S. Cl. .................................. 204/157.2
[58] Field of Search ............. 204/DIG. 11, 157.2

[56] References Cited

U.S. PATENT DOCUMENTS

| 4,212,717 | 7/1980 | Moore et al. | 204/158 |
| 4,313,807 | 2/1982 | de Mevergnies et al. | 204/157.1 |
| 4,406,763 | 9/1983 | Hsu et al. | 204/158 |
| 4,436,709 | 3/1984 | Gauthier | 423/437 |
| 4,941,956 | 7/1990 | Arai et al. | 204/157.2 |

FOREIGN PATENT DOCUMENTS

| 1125230 | 6/1982 | Canada . |
| 58-183932 | 10/1983 | Japan . |
| 59-5335 | 2/1984 | Japan . |
| 60-132629 | 7/1985 | Japan . |
| 60-242898 | 7/1985 | Japan . |
| 63-197217 | 4/1988 | Japan . |
| 1-194931 | 8/1989 | Japan . |

OTHER PUBLICATIONS

D'Ambrosio, C. et al, "$^{13}$C–Separation by a Continuous Discharge CO$_2$ Laser Q-Switched at 10 KH$_z$", *Infrared Physics*, vol. 29, Nos. 2–4 (1989), pp. 479–483.
Baranov et al., *Proc. Conf. Laser*, 1987, 1124.
Takeuchi et al., *Chemical Industry*, 47, 213–217 (1983).
Shimizu, *Chemical Technol. MOL*, 22, 73 (1983).

*Primary Examiner*—John Niebling
*Assistant Examiner*—Steven P. Marquis
*Attorney, Agent, or Firm*—Armstrong, Nikaido, Marmelstein, Kubovcik & Murray

[57] ABSTRACT

This invention relates to a process for enriching carbon 13 by mixing a halogenomethane containing one or more fluorine atoms and carbon 13 of natural isotopic abundance with one or two or more additive gases selected from a group of oxygen-containing oxidizing agents, halogens, and hydrogen halides, irradiating the resulting raw material gas mixture by a carbon dioxide laser to cause selective dissociation and reaction of the halogenomethane of carbon 13, separating the unchanged substances from the reaction mixture to obtain a product enriched with carbon 13, further converting the enriched product to carbon monoxide, and enriching carbon 13 by low-temperature distillation of the carbon monoxide. The process has advantages of low overall energy consumption, high yields of carbon 13, easy separability of the unchanged substances and high degrees of carbon 13 enrichment.

10 Claims, 4 Drawing Sheets

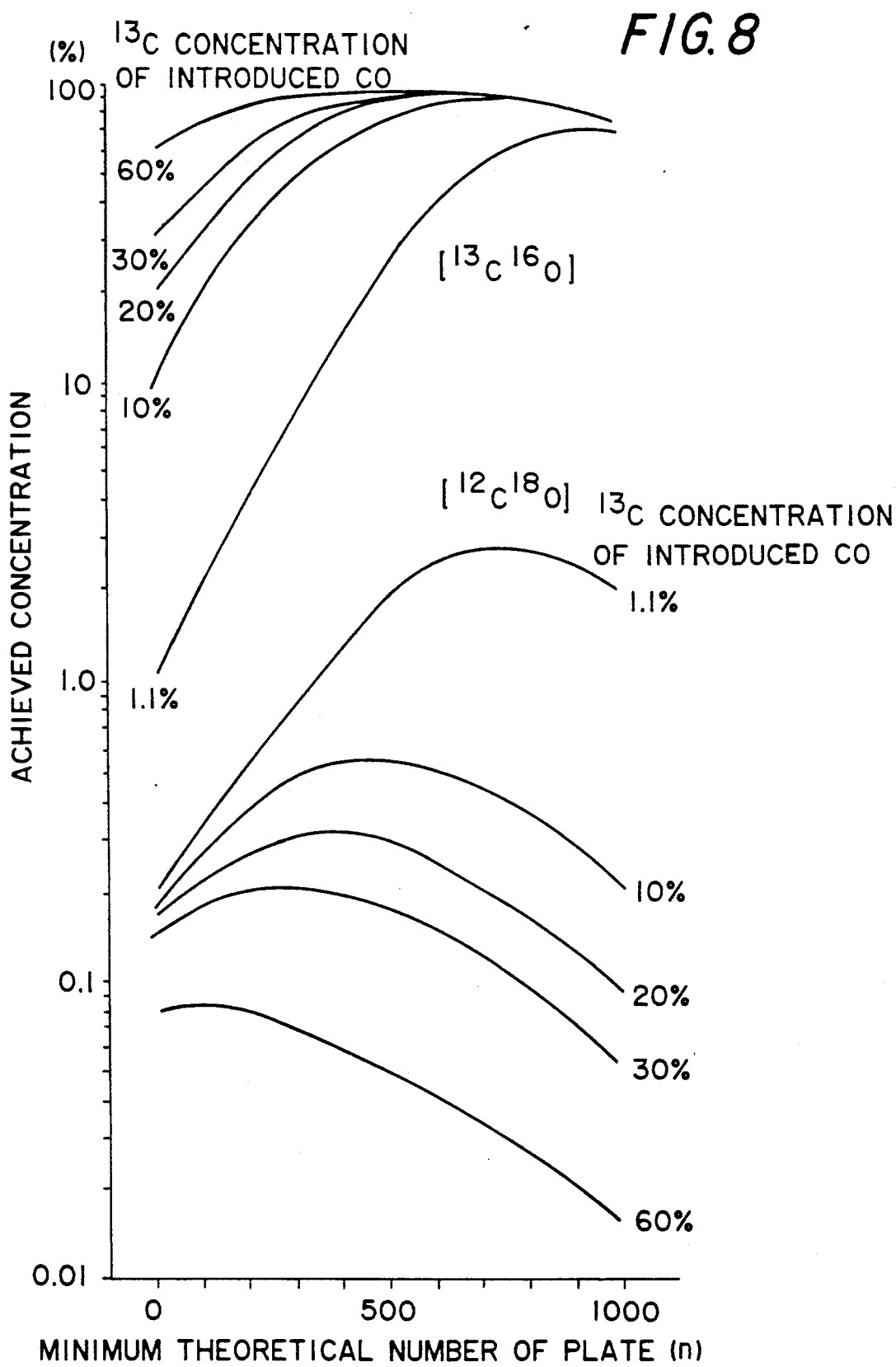

PROCESS FOR ENRICHING CARBON 13

FIELD OF THE INVENTION AND RELATED ART STATEMENT

This invention relates to a process for enriching carbon 13 and, more particularly, to a process for enriching carbon 13 which requires a small consumption of energy to obtain compounds highly enriched with carbon 13.

Naturally-occurring carbon is a mixture of isotopes of mass number 12 and 13, with the former accounting for 98.9% and the latter 1.1%. The latter isotope, carbon 13 ($^{13}C$), is enjoying an increasing demand in recent years, for example, as raw material for labelled compounds in NMR-MRI.

A variety of processes have been proposed for the enrichment of $^{13}C$: for example, a low-temperature CO distillation process which uses liquefied carbon monoxide (CO) as working substance while utilizing the presence of a slight difference in vapor pressure between its isotopes, a chemical exchange process which uses cyanic acid as working substance while utilizing the presence of an isotope exchange effect in the reaction of carbon dioxide with carbamic acid, a laser process which utilizes the isotope effect in the photochemical reaction of Freon compounds, thermal diffusion process which utilizes a slight difference between isotopes in the diffusion rate of methane gas from a low temperature side to a high temperature side, and other processes based on adsorption, gas diffusion, centrifugation, and mass diffusion.

Any of these processes, however, has its merits and demerits and it is only the low-temperature CO distillation process that is practiced on a commercial scale for the enrichment of $^{13}C$ at the present time.

There is, for example, an article on the low-temperature CO distillation process in SEPARATION SCIENCE AND TECHNOLOGY, 15(3), pp. 491–508 (1980). The process will encounter the following problems particularly in the enrichment of $^{13}C$ from the natural abundance of about 1.1% to a concentration in excess of 90%: ① the separation by distillation here concerns components of exceedingly low relative volatility and this reqiures an extremely large number of theoretical plates and, in consequence, large-size equipment and an enormous quantity of energy; ② carbon monoxide, a poison gas, is used in large quantities; and ③ the enrichment of $^{13}C^{16}O$ is accompanied by that of $^{12}C^{18}O$ on account of the two being close to each other in vapor pressure and this makes it difficult to attain an enrichment of $^{13}CO$ in excess of 90% or so.

The chemical exchange process is described, for example, in Japan Tokkyo Kokai Koho No. 61-61,621 (1986). It has an advantage of relatively low energy consumption, but its low exchange rate necessitates the use of large volumes of organic solvents and large-size equipment for enriching $^{13}C$ to a high level.

The laser process uses a mixture of a halogenated hydrocarbon such as a fluorohalogenomethane and a halogen, a hydrogen halide, or oxygen as raw material gas and enriches $^{13}C$ compounds by irradiating the gas mixture by a carbon dioxide laser beam having a wavelength in the infrared range to effect a selective photochemical reaction of either a $^{13}C$ compound or a carbon 12 ($^{12}C$) compound and separating the reaction product of one compound from the unchanged other compound. (Reference should be made, for instance, to Japan Tokkyo Kokai Koho Nos. 60-132,629 (1985), 58-183,932 (1983), and 63-97,217 (1988) and U.S. Pat. Nos. 4,406,763, 4,313,807, and 4,212,717.) It is possible with the laser process to hit selectively those molecules which contain $^{13}C$ at a relatively high probability by a carbon dioxide laser beam and cause them to undergo a photochemical reaction when the concentration of $^{13}C$ in the working substance is low, thus permitting effective utilization of energy. However, the difference in infrared absorption wavelength between the isotopes is not necessarily large, being on the order of about 30 cm$^{-1}$, and it is not expected for a completely selective photochemical reaction to take place. In particular, an enrichment of $^{13}C$ to a high level makes it necessary to repeat the photochemical reaction by the carbon dioxide laser irradiation and the separation of the reaction products from the unchanged substances a number of times, which will result in marked decreases in yield and also in energy efficiency.

The thermal diffusion process and others such as adsorption, gas diffusion, centrifugation, and mass diffusion face a variety of problems; some are suitable for an extremely small-size operation but not for a large-size one while others require complex equipment and incur enhanced cost for the enrichment of $^{13}C$.

Furthermore, U.S. Pat. No. 4,436,709 and Canadian Patent No. 1,125,230 propose a combination of the aforesaid laser and chemical exchange processes while U.S. Ser. No. 07/297,708 and Japan Tokkyo Kokai Koho No. 1-194,931 (1989) describe a process for the enrichment of $^{13}C$ by irradiating a mixture of $CHClF_2$ or $CHBrF_2$ and bromine, hydrogen bromide, or hydrogen iodide by a carbon dioxide laser beam and again irradiating the reaction product separated from the unchanged compounds by a carbon dioxide laser beam. The former process, however, has adopted a chemical exchange process of low efficiency for the final enrichment of $^{13}C$ and has consequently generated problems of increased energy consumption and enlarged equipment. On the other hand, the latter process must be practiced by repeating the procedure of irradiation and separation three times or more with the attendant increase in energy cost to attain an enrichment of 99% or more while an enormous energy input would be needed if the practice is to be completed by repeating the procedure only twice. At any rate, both processes require large quantities of energy for a hig-level enrichment.

OBJECT AND SUMMARY OF THE INVENTION

The present inventors have conducted extensive studies to solve the aforesaid problems in the prior art technologies for the enrichment of $^{13}C$ and found that the aforesaid laser process is characterized by a high energy efficiency in a relatively low concentration range of $^{13}C$ and also by the lack of the problem relating to the low-temperature CO distillation, namely simultaneous enrichment of $^{13}C^{16}O$ and $^{12}C^{18}O$ which are close to each other in vapor pressure, on account of the $^{13}C$-containing molecules being selectively hit to undergo photochemical reactions. They further found that the low-temperature CO distillation process is characterized by a high energy efficiency in a relatively high concentration range of $^{13}C$ and that a suitable combination of the laser process and the low-temperature CO distillation process not only reduces the total energy consumption but also accomplishes the enrichment of $^{13}$C in higher yields and to higher concentrations and completed this invention.

It was additionally found that the laser irradiation of a halogenomethane containing one or more fluorine atoms in the presence of an oxygen-containing oxidizing agent such as $O_2$ and $O_3$ produces $CF_2O$, readily convertible to $CO_2$, as the reaction product enriched with $^{13}$C.

Accordingly, it is an object of this invention to provide a process for enriching carbon 13 which is a combination of the enrichment by the laser process in a relatively low concentration range of $^{13}$C and the enrichment by the low-temperature CO distillation process in a relatively high concentration range of $^{13}$C.

Another object of this invention is to provide a process for enriching carbon 13 which can enrich $^{13}$C in high yields and to high concentrations by combining the laser process and the low-temperature CO distillation process.

A still another object of this invention is to provide a process for enriching carbon 13 which effects the enrichment by the laser process continuously in a relatively low concentration range of $^{13}$C.

A further object of this invention is to provide a process for enriching carbon 13 which comprises mixing a halogenomethane containing one or more fluorine atoms and carbon 13 of natural abundance with one or two or more additive gases selected from oxygen-containing oxidizing agents, halogens, and hydrogen halides, irradiating the resulting gas mixture by a carbon dioxide laser to cause selective dissociation of the halogenomethane containing carbon 13, taking out the product enriched with carbon 13 from the reaction mixture, converting said product enriched with carbon 13 to carbon monoxide, and distilling said carbon monoxide at low temperature.

A still further object of this invention is to provide a process for enriching carbon 13 which comprises using $CHClF_2$ or $CBr_2F_2$ as halogenomethane, mixing said halogenomethane with an oxygen-containing oxidizing agent, irradiating the raw material gas mixture thus obtained by a carbon dioxide laser to effect selectively the reaction of $CHClF_2$ or $CBr_2F_2$ containing $^{13}$C to produce $CF_2O$ enriched with $^{13}$C, converting said $CF_2O$ to $CO_2$, and taking out $CO_2$ enriched with $^{13}$C to accomplish the enrichment by the laser process in a relatively low concentration range of $C^{13}$.

An additional object of this invention is to provide a process for enriching carbon 13 which comprises using $CHClF_2$ as halogenomethane, mixing said halogenomethane with an oxygen-containing oxidizing agent such as $O_2$ and $O_3$ and $Br_2$, irradiating the gas mixture thus obtained by a carbon dioxide laser to produce $CF_2O$ enriched with $^{13}$C, converting said $CF_2O$ to $CO_2$, and taking out $CO_2$ enriched with $^{13}$C to accomplish the enrichment by the laser process in a relatively low concentration range of $^{13}$C.

Another additional object of this invention is to provide a process for enriching carbon 13 which comprises mixing a halogenomethane containing one or more fluorine atoms and carbon 13 of natural abundance with an additive gas containing an oxygen-containing oxidizing agent, irradiating the raw material gas mixture thus obtained by a carbon dioxide laser to effect selective dissociation and reacting the halogenomethane containing carbon 13 to produce $CF_2O$ enriched with carbon 13, and converting said $CF_2O$ to $CO_2$.

This invention accordingly relates to a process for enriching carbon 13 which basically comprises mixing a halogenomethane capable of producing a radical or carbene represented by $CF_3$, $CF_2X$, $CF_2$, $CFX$, or $CFX_2$ (wherein X is a halogen element and may be Cl, Br, or I) upon irradiation by an infrared laser and containing one or more fluorine atoms and $^{13}$C of natural abundance with one or two or more additive gases selected from a group of oxygen-containing oxidizing agents, halogens, and hydrogen halides, irradiating the raw material gas mixture thus obtained by a carbon dioxide laser to cause selectively the reaction of the halogenomethane containing carbon 13, taking out the product enriched with $^{13}$C from the reaction mixture, converting said enriched product to carbon monoxide, and distilling said carbon monoxide at low temperature.

This invention also relates to a process for enriching carbon 13 which comprises mixing a halogenomethane containing one or more fluorine atoms and carbon 13 of natural abundance with an additive gas containing an oxygen-containing oxidizing agent, irradiating the raw material gas mixture thus obtained by a carbon dioxide laser to effect selective dissociation and reaction of the halogenomethane containing carbon 13 to produce $CF_2O$ enriched with carbon 13, and converting said $CF_2O$ to $CO_2$.

The halogenomethanes containing one or more fluorine atoms to be used in this invention are represented by the general formula $CH_aF_bX_c$ (wherein X is Cl, Br, or I, a is an integer from 0 to 3, b is an integer from 1 to 3, c is an integer from 0 to 3, and X may be identical or different when c is 2 or 3) and examples include $CHClF_2$, $CBr_2F_2$, $CBrClF_2$, $CBrF_3$, $CClF_3$, and $CF_3I$. Of the examples mentioned, $CHClF_2$ and $CBr_2F_2$ are preferable. The halogenomethanes containing one or more fluorine atoms are used for the reasons that naturally-occurring fluorine has no isotopes, namely it is 100% fluorine 19 ($^{19}$F), and clearly shows an isotope effect and that a fluorocarbon containing a halogen (X) and hydrogen (H) readily gives off X and H to form compounds such as $X_2$ and HX.

The additive gas to be used in this invention is one or two or more compounds selected from a group of oxygen-containing oxidizing agents, halogens, and hydrogen halides and exists as a gas or a vapor having a specified vapor pressure under the conditions of laser irradiation. The additive gas reacts with a radical or carbene formed by the dissociation of the halogenomethane upon irradiation by a laser to give a compound different from the unchanged substances, thus enabling the separation of the reaction product from the unchanged substances, and it also prevents the dimerization of the halogenomethane. The additive gas may contain an inert gas such as argon.

The oxygen-containing oxidizing agents to be used in this invention include oxygen ($O_2$) and ozone ($O_3$) and a variety of other compounds capable of effecting oxidation such as nitrogen oxides and sulfur oxides. Oxygen and ozone are preferable. The halogens and hydrogen halides to be used in this invention include $Br_2$, $Cl_2$, $I_2$, HBr, HCl, and HI. When an oxygen-containing oxidizing agent is used as additive gas, the reaction product enriched with $^{13}$C takes the form of $CF_2O$, which reacts readily with water ($H_2O$) to yield carbon dioxide ($CO_2$) enriched with $^{13}$C. This $CO_2$ can be converted with ease to carbon monoxide (CO), the working substance in the subsequent low-temperature distillation and, to an additional advantage, it can be stored stably and safely as its carbonate. If an oxygen-containing oxidizing agent is made to coexist with a halogen or hydrogen halide, the radical or carbene formed by the laser irradiation reacts with the halogen or hydrogen halide to form a product which dissociates by the laser irradiation and reacts with oxygen to form $CF_2O$. In this case, the dissociation and the enrichment reaction of $^{13}C$ occur twice in the same system and this further enhances the degree of enrichment of $^{13}C$. It is also permissible to carry out the laser irradiation in two steps, first on a raw material gas mixture of a halogenomethane and a halogen or hydrogen halide and then on a raw material gas mixture of the reaction product of the first laser irradiation and an oxygen-containing oxidizing agent, thereby obtaining $CF_2O$ as product enriched with $^{13}C$ after the second laser irradiation.

In this invention, the laser process and the low-temperature CO distillation process are used together. It is desirable to enrich $^{13}C$ to 5% or more, preferably to 10 to 90%, more preferably to 20 to 70%, by using a halogenomethane containing one or more fluorine atoms and $^{13}C$ of natural abundance in the first enrichment of $^{13}C$ by the laser process, and then to 95% or more, preferably to 98% or more, more preferably to 99% or more, in the subsequent enrichment of $^{13}C$ by the low-temperature CO distillation process. A too low enrichment of $^{13}C$ by the laser process causes a problem similar to that encountered in the direct low-temperature distillation of CO containing $^{13}C$ of natural abundance while an enrichment of $^{13}C$ in excess of 90% incurs a too large consumption of energy by the laser process, thus increasing the energy consumption of the process for enriching $^{13}C$ as a whole.

The reaction of a halogenomethane induced by a carbon dioxide laser to be adopted in the process of this invention is explained below with reference to the case where $CHClF_2$ or $CBr_2F_2$ is used as halogenomethane, oxygen ($O_2$) as oxygen-containing oxidizing agent, and bromine gas ($Br_2$) as halogen.

$CHClF_2$ has an absorption band assignable to the stretching vibration of the $^{12}C-F$ bond in the vicinity of a wave number of $1,100\ cm^{-1}$ and an absorption band assignable to the stretching vibration of the $^{13}C-F$ bond on the longer wave length side, smaller by a wave number of approximately $30\ cm^{-1}$. When $CHClF_2$ of a few Torr to several hundreds of Torr is irradiated by a carbon dioxide laser beam, for example, at a wavelength roughly in the infrared range from 1,020 to 1,080 $cm^{-1}$ and a flux of 0.5 to 10 $J/cm^2$ or so, $CHClF_2$ containing $^{13}C$ selectively undergoes the infrared multiple photon dissociation to generate $CF_2$ carbene according to the following equation (1).

$$CHClF_2 + nh\nu \rightarrow CF_2 + HCl \quad (1)$$

The raw material $CHClF_2$, if made to coexist with $O_2$, forms $CF_2O$. The mechanism of this reaction is not clear, but the plausible explanation is that $CF_2O$ enriched with $^{13}C$ forms as the reaction progresses according to the following equation (2) or equations (3) and (4).

$$CF_2 + O_2 \rightarrow CF_2O + O \quad (2)$$

$$3O_2 \rightarrow 2O_3 \quad (3)$$

$$CF_2 + O_3 \rightarrow CF_2O + O_2 \quad (4)$$

The $CF_2O$ thus formed is readily hydrolyzed by water into carbon dioxide ($CO_2$) and hydrogen fluoride (HF) according to the following equation (5).

$$CF_2O + H_2O \rightarrow CO_2 + 2HF \quad (5)$$

Now, if an aqueous solution of an alkaline substance such as barium hydroxide or calcium hydroxide is used in the aforesaid hydrolysis, barium carbonate or calcium carbonate is recovered, for example, according to the following equation (6).

$$CF_2O + 2Ba(OH)_2 \rightarrow BaCO_3 + BaF_2 + 2H_2O \quad (6)$$

This reaction progresses even in the absence of water as the above equation (6) indicates.

The carbonate thus obtained is decomposed stoichiometrically by an acid such as aqueous hydrochloric acid and recovered as $CO_2$. This $CO_2$ is then converted to carbon monoxide (CO) by a publicly known reduction reaction using metals and the like as reducing agent. The unchanged $CO_2$ can be separated by condensation at a low temperature where CO is not condensible and the CO is transferred to the subsequent step for low-temperature CO distillation.

When $CBr_2F_2$, used as raw material halogenomethane, is irradiated by a carbon dioxide laser in the co-presence of oxygen as above, it forms $CF_2O$ enriched with $^{13}C$ according to the following equation (7) and is then readily hydrolyzed by water into carbon dioxide and hydrogen fluoride, with the carbon dioxide further converted to carbon monoxide.

$$CBr_2F_2 + O_2 + nh\nu \rightarrow CF_2O + Br_2 + O \quad (7)$$

Furthermore, when $CHClF_2$ as raw material is irradiated by a carbon dioxide laser in the co-presence of $O_2$ and $Br_2$ as above, it undergoes the reaction of the abovementioned equation (1) and then the reaction of the following equation (8) to give $CBr_2F_2$.

$$CF_2 + Br_2 \rightarrow CBr_2F_2 \quad (8)$$

The $CBr_2F_2$ then undergoes the reaction of equation (7) to yield $CF_2O$ followed by the hydrolysis with water into carbon dioxide and hydrogen fluoride and the conversion of the carbon dioxide to carbon monoxide.

If the laser irradiation is carried out in the absence of an oxygen-containing oxidizing agent and in the presence of a halogen or hydrogen halide, a fluorine-containing halogenomethane different from the raw material halogenomethane is formed as reaction product. In this case, the fluorine-containing halogenomethane formed is separated by distillation and the like, then oxidized to $CO_2$ by an oxygen-containing oxidizing agent such as oxygen, and the $CO_2$ is converted to CO by a publicly known process.

As described above, the product enriched with $^{13}C$ to some extent by the laser process is converted to carbon monoxide and further enriched by the subsequent low-temperature CO distillation process. The low-temperature CO distillation process may be similar to the one described in the previously quoted article in SEPARATION SCIENCE AND TECHNOLOGY. An example is given below.

The distillation process may be batch, but it is advantageous to adopt a continuous distillation system containing a rectification column of a suitable diameter installed in a superinsulation cold box and filled with irregular packings such as Dixon ring and Heli packing. An inlet for the feed is provided in the column in such a manner as to give an adequate number of theoretical plates in the enrichment section below and recovery section above, the carbon monoxide enriched with $^{13}C$ to a prescribed level by the laser process is supplied at a given rate to the column which is operated at a column top temperature of $-191°$ C. and a column bottom temperature of $-190°$ C. and at ambient pressure by liquid nitrogen cooling with reflux at the column top, and CO highly enriched with $^{13}C$ is taken out from the enrichment section while CO with a low concentration of $^{13}C$ is recovered from the recovery section. The CO with a low concentration of $^{13}C$ thus recovered is still far more enriched than its natural abundance and it can be used as it is in applications tolerating low concentrations such as agriculture or it can be methanated and treated with fluorine or with fluorine and other halogens or hydrogen halides to yield halogenomethanes for reuse.

BRIEF DESCRIPTION OF THE DRAWINGS

FIG. 8 is a graph showing the relationship between the minimum theoretical number of plates and the achieved concentrations of $^{13}C^{16}O$ and $^{12}C^{18}O$.

DETAILED DESCRIPTION OF THE PREFERRED EMBODIMENTS

Figure 1:
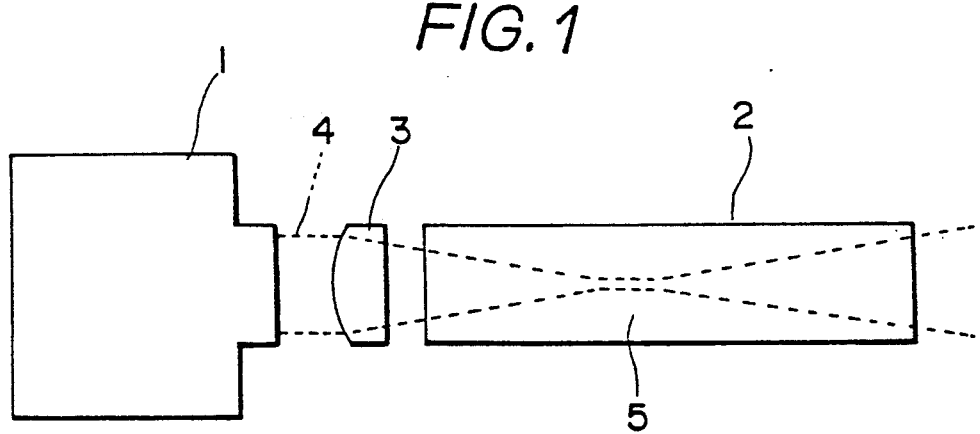
FIG. 1 illustrates a laser beam emitted from a laser oscillator being condensed by a lens to obtain the desired flux in the laser reaction.

In the process of this invention, it is necessary to condense a laser beam emitted from the laser oscillator by a lens in order to obtain the desired flux for the laser reaction. An apparatus for this reaction may fundamentally be as illustrated in FIG. 1 in which a condensing lens 3 is provided between a laser oscillator 1 and a reactor 2 to condense a laser beam in a photoreaction zone 5 inside the reactor 2.

Figure 2:
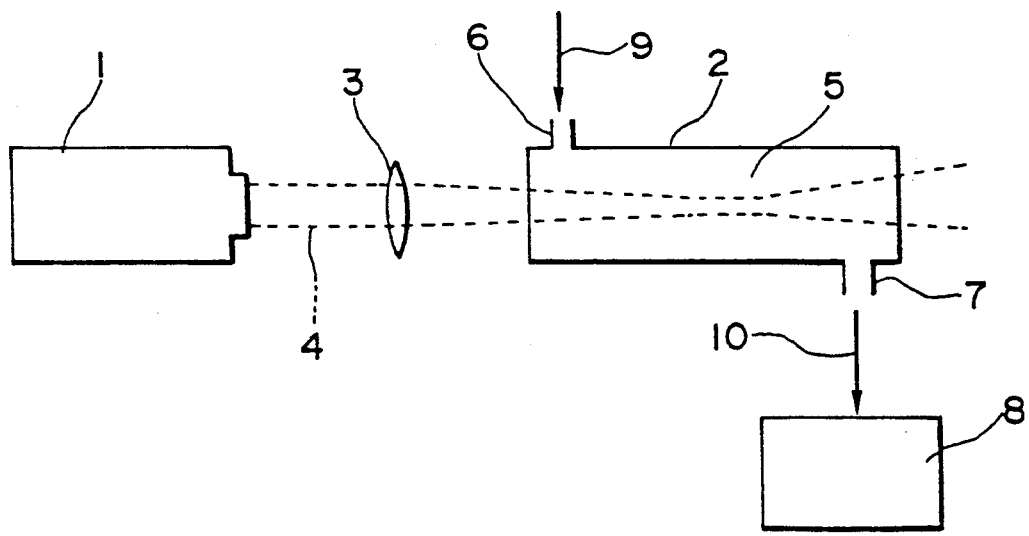
FIG. 2 illustrates a reactor for the laser reaction designed for continuous supply of the raw material gas and continuous takeout of the reaction mixture.

The apparatus for the laser reaction illustrated in FIG. 2 is designed for the laser reaction to be carried out on a continuous basis. A reactor 2 is provided with an inlet 6 and an outlet 7, with the outlet 7 connected to a separator 8. A raw material gas 9 continuously introduced from the inlet 6 is irradiated by a laser beam while residing inside the reactor 2 and a reaction product 10 is continuously taken out from the outlet 7 and sent to the separator 8 where it is separated from the unchanged substances.

Figure 3:
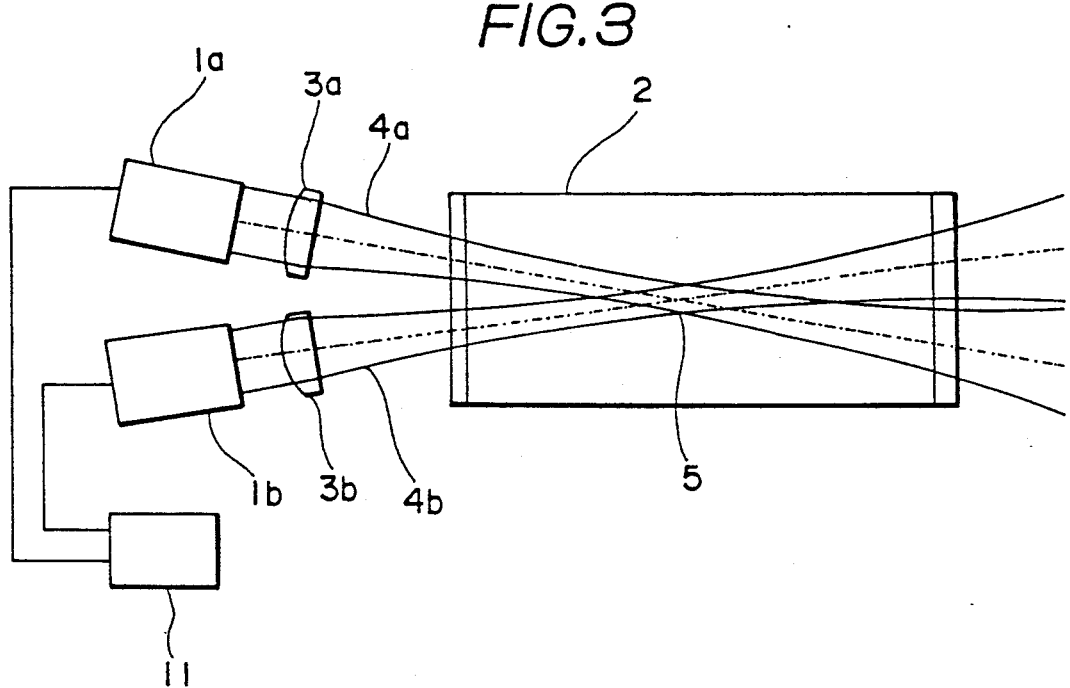
FIG. 3 illustrates laser beams emitted from a plurality of laser oscillators being condensed by lenses and overlapped in respect to time and space inside the reactor.

The apparatus for the laser reaction illustrated in FIG. 3 contains a reactor 2 and a plurality of laser oscillators 1a and 1b and laser beams 4a and 4b from the laser oscillators 1a and 1b pass through condensing lenses 3a and 3b to be crossed in a photoreaction zone 5 inside the reactor 2 in respect to time and space with the crossing angle of the laser beams controlled within 30° and the time lag between the laser pulses within 100 n sec. It is possible by this means to enhance the enriching efficiency of the isotope per unit amount of laser beam. A device 11 in the figure is a trigger signal generator which controls the time lag between the laser pulses within 100 n sec.

Figure 4:
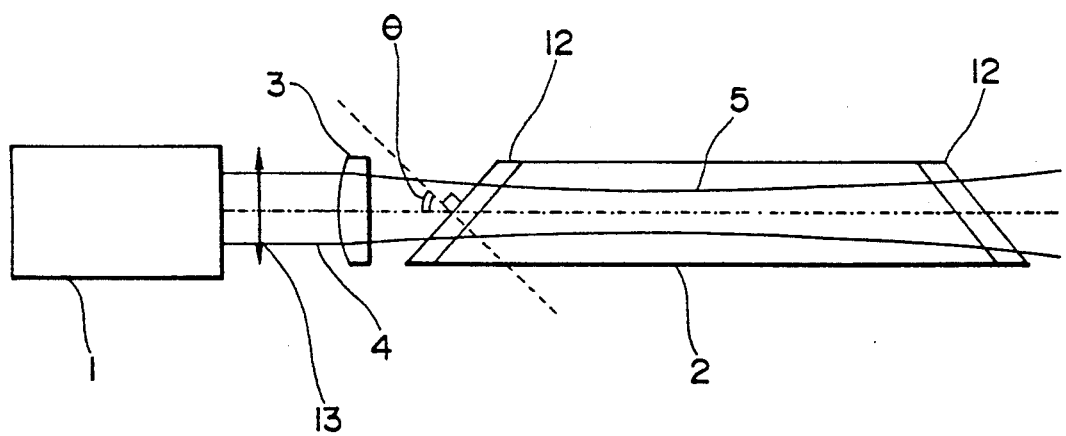
FIG. 4 illustrates a reactor for the laser reaction provided with windows inclined at a given angle around an axis perpendicular to the linear polarized plane.

The apparatus for the laser reaction illustrated in FIG. 4 contains a reactor 2 whose window 12 is inclined at a given angle $\theta$ around an axis perpendicular to a linear polarization direction 13 and the control of this angle $\theta$ in such a manner as to obtain $n = \tan \alpha$ (n is the refractive index of the window at the wave length of the laser beam) and
$\alpha - 5° \leq \theta \leq \alpha + 5°$ enables effective utilization of the laser beam without attenuation.

Figure 5:
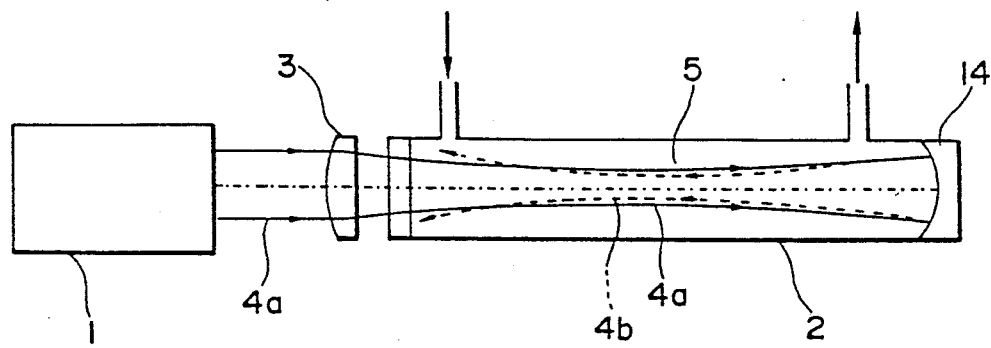
FIG. 5 illustrates a reactor for the laser reaction provided with a light reflector at the rear end of the photoreaction zone in the forward pass of the laser beam.

The apparatus for the laser reaction illustrated in FIG. 5 has a light reflector 14 in the rear of a photoreaction zone 5 inside a reactor 2 and such part of an incident laser beam 4a as passing through a condensing lens 3, the reactor 2, and the photoreaction zone 5 without participating in the photoreaction is reflected back by the light reflector 14 and focused in the photoreaction zone 5 for effective utilization of a reflected laser beam 4b. It is desirable here to control the deviation $\Delta$ of the focal point of the incident laser beam 4a from that of the reflected laser beam 4b and the focal length f of the condensing lens 3 in such a manner as to obtain the relationship $-f/4 \leq \Delta \leq f/4$. The reflector 14 may be composed of a rear window in the form of a concave mirror or of a concave mirror and a convex lens and it may be placed outside the reactor 2.

Figure 6:
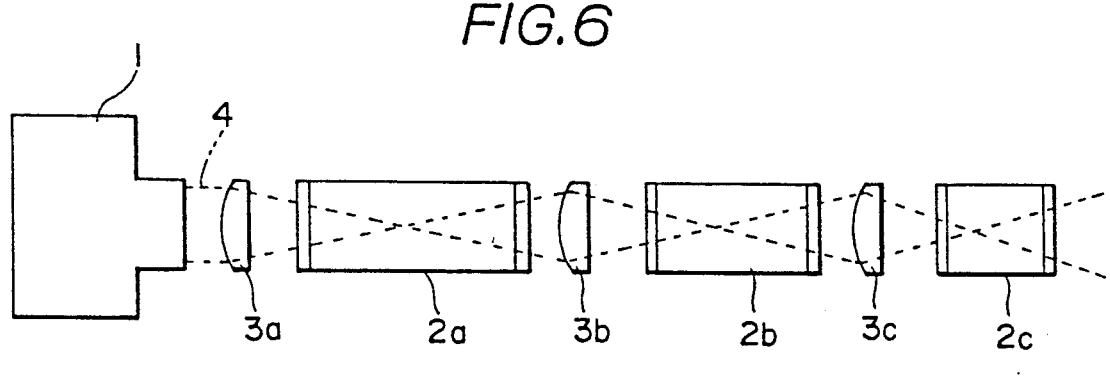
FIG. 6 illustrates a reactor for the laser reaction containing a plurality of photoreaction systems in series, each consisting of an optical system for condensing the laser beam and a reaction zone in its rear.

The apparatus for the laser reaction illustrated in FIG. 6 contains the first photoreaction system (2a, 3a) consisting of a reactor 2a and a condensing lens 3a for condensing a laser beam, the second photoreaction system (2b, 3b) consisting of a reactor 2b and a condensing lens 3b placed in the rear of the first, and the third photoreaction system (2c, 3c) consisting of a reactor 2c and a condensing lens 3c placed in the rear of the second and effectively utilizes a laser beam 4 passing without participating in the photoreaction. There is no specific limitation to the number of photoreaction systems to be provided and it is recommended to set the focal length $f_a, f_b, f_c, \ldots$ of the condensing lenses 3a, 3b, 3c, $\ldots$ as $f_a > f_b > f_c > \ldots$. The reactor may be composed of independent units as illustrated in FIG. 6 or it may be one long unit compartmentalized into photoreaction zones by a plurality of condensing lenses arranged inside the reactor.

Figure 7:
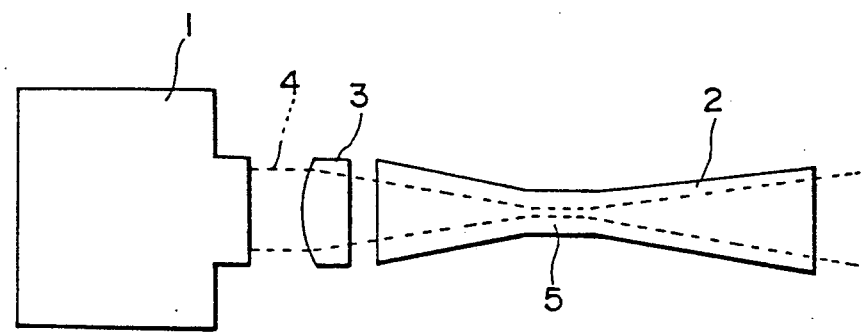
FIG. 7 illustrates a reactor for the laser reaction formed in a shape roughly equal to the space through which the laser beam passes after the condensing system.

The apparatus for the laser reaction illustrated in FIG. 7 has a reactor 2 shaped roughly as the space through which a laser beam passes after a condensing lens 3 and effectively utilizes a laser beam 4 entering the reactor 2.

The flow charts for practicing this invention are explained below.

The following flow charts are conceivable for practicing this invention:

(I) A→B→C→D→E→F (II) A→B→D→C→D→E→F (III) A→B→D→G→B→C→D→E→F.

The steps designated as A to G mean the following.

A: Preparation of the raw material gas mixture

B: Irradiation with a carbon dioxide laser

C: Conversion to $CO_2$

D: Separation or recovery

E: Conversion to CO

F: Low-temperature CO distillation

G: Mixing of the separated reaction product with an oxygen-containing oxidizing agent A specific example of the aforesaid flow chart (I) is as follows.

Raw material gas mixture: $CHClF_2 + O_2$
↓
Irradiation with a carbon dioxide laser: formation of $CF_2O$
↓
Hydrolysis: formation of $CO_2$
↓
Separation: recovery of $CO_2$
↓
Reduction: formation of CO
↓
Low-temperature CO distillation: recovery of product $^{13}CO$ highly enriched with $^{13}C$ A specific example of the aforesaid flow chart (II) is as follows.

Raw material gas mixture: $CHClF_2 + O_2 + Br_2$
↓
Irradiation with a carbon dioxide laser: formation of $CF_2O$
↓
Separation: separation of $Br_2$
↓
Hydrolysis: formation of $CO_2$
↓
Separation: recovery of $CO_2$
↓
Reduction: formation of CO
↓
Low-temperature CO distillation: recovery of product $^{13}CO$ highly enriched with $^{13}C$ In the case of flow chart (II), it is possible to omit the separation step immediately following the irradiation with a carbon dioxide laser.

A specific example of the aforesaid flow chart (III) is as follows.

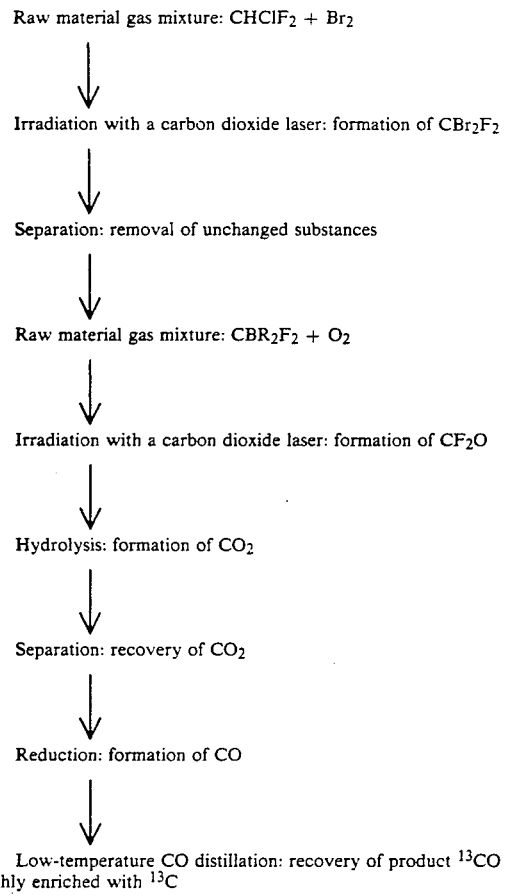

In such a flow chart, it is desirable to use a TEA type carbon dioxide laser oscillator having a built-in diffraction grating as laser oscillator with the wave number set in the vicinity of 1,020 to 1,080 cm$^{-1}$ and carry out the irradiation in such a manner as to cause approximately 1/10 to 3/4 of $^{13}$C in the raw material to react. The unchanged substances after the irradiation may be separated by such means as distillation, low-temperature condensation, and adsorption and the reduction may be conducted by contact with metallic zinc at approximately 400° to 500° C.

Several specimens enriched with $^{13}$C to different levels were prepared by changing the conditions of the irradiation by a carbon dioxide laser and then distilled in a model low-temperature distillation column to determine the relationship between the minimum theoretical number of plate (n) and the achieved concentrations of $^{13}$C$^{16}$O and $^{12}$C$^{18}$O. The results are shown in FIG. 8.

The relationship between the $^{13}$C concentration of introduced CO and the minimum theoretical number of plate under total reflux or the required number of plate in continuous distillation with the withdrawal of the product taken into account is shown in Table 1 for the enrichment of $^{13}$C to 99%.

It is indicated that the concentration of $^{12}$C$^{18}$O always becomes 0.6% or less as long as the concentration of $^{13}$C is 10% or more and $^{13}$CO with a $^{13}$C concentration of 99% or more can be obtained without the isotope exchange reaction by setting the number of plates equal to or greater than the required number of plates shown in Table 1.

TABLE 1

| $^{13}$C Concentration of introduced CO (%) | Minimum theoretical number of plates | Required number of plates |
|---|---|---|
| 1.1 | Not achieving 99% | — |
| 10 | 980 | 2,560 |
| 20 | 860 | 2,070 |
| 30 | 790 | 1,900 |
| 40 | 720 | 1,690 |
| 50 | 660 | 1,460 |
| 60 | 610 | 1,330 |

Moreover, the relationship between the energy requirement for obtaining $^{13}$CO with $^{13}$C enriched to 99% and the $^{13}$C concentration of introduced CO is shown in Table 2. The amount of energy required when CO with 10% $^{13}$C is introduced is taken as 100 in the table.

TABLE 2

| $^{13}$C Concentration of introduced CO (%) | Energy requirement | | |
|---|---|---|---|
| | Laser irradiation | Low-temperature distillation | Total |
| Control (1.1%) | 0 | 118 | 118 |
| 10 | 5 | 95 | 100 |
| 20 | 11 | 74 | 85 |
| 30 | 19 | 54 | 73 |
| 40 | 28 | 41 | 69 |
| 50 | 38 | 29 | 67 |
| 60 | 51 | 18 | 69 |
| 70 | 66 | 11 | 77 |
| 80 | 84 | 7 | 91 |
| 90 | 107 | 3 | 110 |
| Control (99%) | 137 | 0 | 137 |

EXAMPLE 1

The enrichment of $^{13}$C was carried out according to the following flow chart.

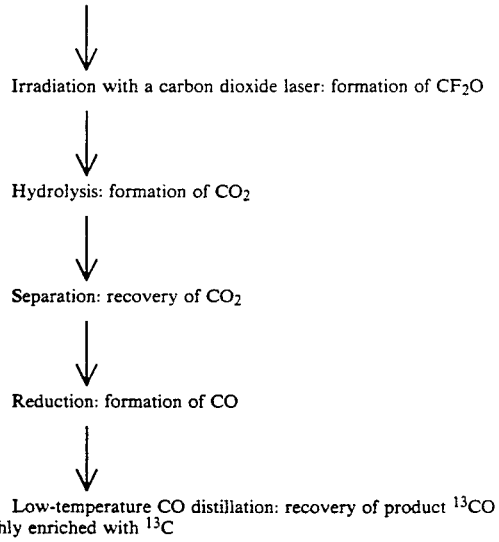

An apparatus of the design illustrated in FIG. 1 was used for the laser reaction. The reactor is built of a quartz glass cylinder, 3 cm in internal diameter and 2.0 m in length, and equipped at both ends with infrared optical windows made of NaCl. A carbon dioxide laser beam of a wave number of 1,045.02 cm$^{-1}$ and an output of 8 J/pulse was condensed with a BaF$_2$ lens of a focal length of 1.5 m and used for the irradiation.

The CF₂O formed in the laser reaction was converted to CO₂ by hydrolysis and recovered. The $^{13}C$ abundance was determined by a mass spectrometer from the ratio of $^{12}C^{16}O_2$ (m/z=44) and $^{13}C^{16}O_2$ (m/z=45) while the amount of CO₂ formed (the extent of reaction caused by the laser) was determined from the ratio of the CO₂ formed after the hydrolysis and the unchanged CHClF₂ by gas chromatography.

The laser reaction was found to yield CO₂ with a $^{13}C$ abundance of 30% at a rate of $3.0 \times 10^{-7}$ mole/pulse. The CO₂ obtained by the laser process was reduced to CO by contact with metallic zinc at approximately 400° C.

The low-temperature CO distillation was simulated in the following manner. A continuous rectification system was set up by placing a rectification column with a diameter of 30 mm filled with irregular Dixon rings as packing materials in a superinsulation cold box while setting the number of theoretical plates at 1,450 in the concentration section and at 450 in the recovery section. The aforesaid CO with the $^{13}C$ abundance of 30% obtained in the laser process was fed at a rate of 0.344 mole/hour to the column which was operated at a column top temperature of −191° C., a column bottom temperature of −190° C., and ambient pressure by liquid nitrogen cooling with reflux at the column top and CO with a $^{13}C$ concentration of 99% was taken out from the concentration section at a rate of 0.083 mole/hour and CO with a $^{13}C$ concentration of 7.8% was recovered from the recovery section at a rate of 0.261 mole/hour.

The electric powder requirement per 1 gram of $^{13}CO$ with the $^{13}C$ concentration of 99% was 24 KWh in the laser concentration step, 3 kWh in the hydrolyis and reduction steps, and 76 KWh in the low-temperature CO distillation step for a total of 103 KWh.

EXAMPLE 2

The enrichment of $^{13}C$ was carried out according to the following flow chart.

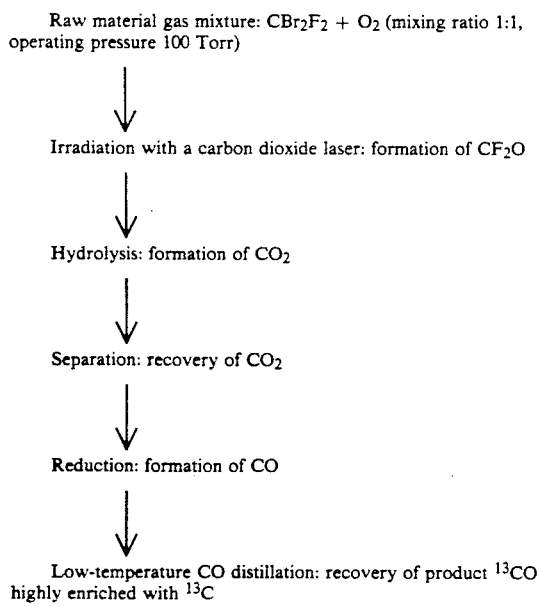

An apparatus of the design illustrated in FIG. 1 was used for the laser reaction. The reactor is built of a quartz glass cylinder, 3 cm in internal diameter and 3.0 m in length, and equipped at both ends with infrared optical windows made of NaCl. A carbon dioxide laser beam of a wave number of 1,039.37 cm⁻¹ and an output of 7 J/pulse was condensed with a BaF₂ lens of a focal length of 3.0 m and used for the irradiation.

The CF₂O formed in the laser reaction was converted to CO₂ by hydrolysis and recovered. The isotopic abundance of $^{13}C$ and the amount of CO₂ formed were determined as in Example 1.

The laser reaction was found to yield CO₂ with a $^{13}C$ abundance of 63% at a rate of $1.2 \times 10^{-7}$ mole/pulse. It was confirmed, as in Example 1 above, that the CO₂ obtained by the laser process was reduced to CO by contact with metallic zinc at approximately 400° C. and then distilled at low temperature to give $^{13}CO$ with a high concentration of $^{13}C$ in high yields.

EXAMPLE 3

An apparatus of the design illustrated in FIG. 2 was used for the laser reaction. The reactor was built of a quartz glass cylinder, 3 cm in internal diameter and 2.7 m in length, and equipped at both ends with infrared optical windows made of NaCl. A gas mixture of CHClF₂ and Br₂ at a pressure ratio of 2:1 was supplied continuously from the inlet toward the outlet in the same direction as that of the laser beam while controlling the pressure inside the reactor at 150 Torr and the linear velocity inside the reactor at 70 cm/sec and was recovered after the irradiation.

A carbon dioxide laser beam of a wave number of 1,045.02 cm⁻¹ and an output of 8 J/pulse was condensed by a BaF₂ lens of a focal length of 2.0 m and the gas mixture was irradiated at 5 pulses/sec.

The gas mixture continuously recovered after the reaction from the outlet of the reactor was analyzed as in the aforesaid Example 1 and the results confirmed the formation of CBr₂F₂ with a $^{13}C$ concentration of 35% as reaction product at a rate of $1.7 \times 10^{-6}$ mole $^{13}C$/sec.

The CBr₂F₂ with the $^{13}C$ concentration of 35% thus prepared was converted to CO₂ by heating in the presence of O₂ and it was confirmed, as in Example 1, that the CO₂ can be reduced to CO by metallic zinc and distilled at low temperature to give $^{13}CO$ with a high concentration of $^{13}C$ in high yields.

EXAMPLE 4

The enrichment of $^{13}C$ was carried out according to the following flow chart.

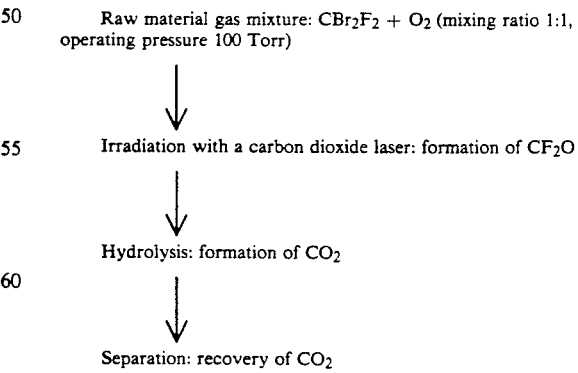

An apparatus of the design illustrated in FIG. 1 was used for the laser reaction. The reactor is built of a quartz glass cylinder, 3 cm in internal diameter and 2.7 m in length, and equipped at both ends with infrared optical windows made of NaCl. A carbon dioxide laser beam of a wave number of 1,039.37 cm$^{-1}$ and an output of 8 J/pulse was condensed by a BaF$_2$ lens of a focal length 2.0 m and used for the irradiation.

The CF$_2$O formed in the laser reaction was converted to CO$_2$ by hydrolysis and recovered. The $^{13}$C abundance and the amount of CO$_2$ formed were determined as in the aforesaid Example 1.

The laser reaction yielded CO$_2$ with a $^{13}$C concentration of 75% at an enrichment efficiency of $2 \times 10^{-7}$ mole $^{13}$C/pulse.

EXAMPLE 5

The experiment was carried out under the same conditions as in the aforesaid Example 4 except using a gas mixture of CHClF$_2$ of 100 Torr and O$_2$ of 15 Torr. The results indicated that CO$_2$ with a $^{13}$C concentration of 78% was obtained at an enrichment efficiency of $3 \times 10^{-7}$ mole $^{13}$C/pulse.

EXAMPLE 6

The experiment was carried out under the same conditions as in the aforesaid Example 4 except using a gas mixture of CHClF$_2$ of 100 Torr, Br$_2$ of 30 Torr, and O$_2$ of 15 Torr. The results indicated that CO$_2$ with a $^{13}$C concentration of 75% was obtained at an enrichment efficiency of $4 \times 10^{-7}$ mole $^{13}$C/pulse.

EXAMPLE 7

The experiment was carried out under the same conditions as in the aforesaid Example 4 except using a gas mixture of CHClF$_2$ of 100 Torr, hydrogen iodide (HI) of 25 Torr, and O$_2$ of 10 Torr. The results indicated that CO$_2$ with a $^{13}$C concentration of 78% was obtained at an enrichment efficiency of $3 \times 10^{-7}$ mole $^{13}$C/pulse.

It was confirmed in the aforesaid Examples 4 to 7, as in Example 1, that the CO$_2$ was reduced to CO and then distilled at low temperature to give $^{13}$CO with $^{13}$C enriched to 99% or more in high yields.

What is claimed is:

1. A process for enriching carbon 13 comprising mixing a halogenomethane selected from the group consisting of CHClF$_2$ and CBr$_2$F$_2$ containing carbon 13 of natural isotopic abundance with an additive gas selected from the group consisting of an oxygen-containing oxidizing agent, a gas mixture of oxygen-containing oxidizing agent and at least one of a halogen and a hydrogen halide, irradiating the resulting raw material gas mixture by a carbon dioxide laser thereby selectively dissociating the halogenomethane of carbon 13 withdrawing a product having carbon 13, concentration of 10 to 90% from the reaction mixture, converting said enriched product to carbon monoxide, and distilling said carbon monoxide at low temperature.

2. A process for enriching carbon 13 according to claim 1 wherein the raw material gas mixture is continuously supplied to a reactor for the laser reaction and the reaction mixture is continuously withdrawn from said reactor.

3. A process for enriching carbon 13 according to claim 1 further comprising mixing said halogenomethane with an oxygen-containing oxidizing agent, irradiating the resulting raw material gas mixture by a carbon dioxide laser thereby selectively oxidizing the halogenomethane of carbon 13 to form CF$_2$O enriched with carbon 13, converting said CF$_2$O to CO$_2$, and withdrawing CO$_2$ enriched with carbon 13.

4. A process for enriching carbon 13 comprising mixing a halogenomethane containing carbon 13 of natural isotopic abundance with an oxygen-containing oxidizing agent and a halogen gas other than fluorine, irradiating the resulting raw material gas mixture by a carbon dioxide laser thereby causing selective dissociation and reaction of the halogenomethane of carbon 13 to form CF$_2$O enriched with carbon 13, and converting said CF$_2$O to CO$_2$.

5. A process for enriching carbon 13 according to claim 4, wherein the halogenomethane is CHClF$_2$ and CBr$_2$F$_2$.

6. A process for enriching carbon 13 comprising mixing a halogenomethane containing one or more fluorine atoms and carbon 13 of natural isotopic abundance with an oxygen-containing oxidizing agent and optionally at least one additive gas selected from the group consisting of halogens and hydrogen halides, irradiating the resulting raw material gas mixture by a carbon dioxide laser thereby selectively dissociating the halogenomethane of carbon 13, taking out a product enriched with carbon 13 from the reaction mixture, converting said enriched product to carbon monoxide, distilling said carbon monoxide at low temperature, and preventing an isotope exchange reaction by which $^{12}$C$^{18}$O is exchanged to $^{12}$C$^{16}$O that is easily separated from $^{13}$CO.

7. A process for enriching carbon 13 comprising mixing CHClF$_2$ containing carbon 13 of natural isotopic abundance with Br$_2$ and an oxygen-containing oxidizing agent selected from the group consisting of O$_2$ and O$_3$, irradiating the resulting gas mixture by a carbon dioxide laser to form CF$_2$O enriched with carbon 13, converting said CF$_2$O to CO$_2$, withdrawing CO$_2$ enriched with carbon 13, reducing said CO$_2$ to CO, and distilling said CO at low temperature.

8. A process for enriching carbon 13 characterized by mixing CHClF$_2$ containing carbon 13 of natural isotopic abundance with Br$_2$, irradiating the resulting raw material gas mixture by a carbon dioxide laser thereby selectively dissociating CHClF$_2$ of carbon 13 to form CBr$_2$F$_2$ enriched with carbon 13, removing unchanged CHClF$_2$, mixing said CBr$_2$F$_2$ with O$_2$, irradiating the resulting raw material gas mixture by a carbon dioxide laser to form CF$_2$O enriched with carbon 13, converting said CF$_2$O to CO$_2$, withdrawing CO$_2$ enriched with carbon 13, reducing said CO$_2$ to CO, and distilling said CO at low temperature.

9. A process for enriching carbon 13 comprising mixing CHClF$_2$ containing carbon 13 of natural isotopic abundance with O$_2$, irradiating the resulting raw material gas mixture by a carbon dioxide laser thereby selectively dissociating CHClF$_2$ containing carbon 13 to form CF$_2$O enriched with carbon 13, reducing said CO$_2$ to CO, and distilling said CO at low temperature.

10. A process for enriching carbon 13 comprising mixing a halogenomethane selected from CHClF$_2$ and CBr$_2$F$_2$ containing carbon 13 of natural isotopic abundance with an additive gas containing oxygen and at least one of a halogen and a hydrogen halide, irradiating the resulting raw material gas mixture by a carbon dioxide laser thereby selectively dissociating the halogenomethane of carbon 13, taking out a product having a carbon 13 concentration of 10 to 90% from the reaction mixture, converting said enriched product to carbon monoxide, and distilling said carbon monoxide at low temperature.

* * * * *